United States Patent [19]

Norman

[11] Patent Number: 5,754,567
[45] Date of Patent: May 19, 1998

[54] WRITE REDUCTION IN FLASH MEMORY SYSTEMS THROUGH ECC USAGE

[75] Inventor: Robert D. Norman, Santa Clara, Calif.

[73] Assignee: Micron Quantum Devices, Inc., Santa Clara, Calif.

[21] Appl. No.: 729,951

[22] Filed: Oct. 15, 1996

[51] Int. Cl.[6] .............. G06F 11/10; G06F 12/00; G11C 29/00
[52] U.S. Cl. .................. 371/40.18; 365/185.09; 371/51.1; 395/185.07; 711/103
[58] Field of Search .............. 371/40.18, 51.1; 395/185.07, 182.04; 711/103

[56] References Cited

U.S. PATENT DOCUMENTS

| | | | |
|---|---|---|---|
| 5,276,834 | 1/1994 | Mauritz et al. | 395/425 |
| 5,392,288 | 2/1995 | Rudman et al. | 371/2.2 |
| 5,428,630 | 6/1995 | Weng et al. | 371/40.1 |
| 5,459,850 | 10/1995 | Clay et al. | 396/497.02 |
| 5,513,137 | 4/1996 | Lee et al. | 365/185.09 |
| 5,515,333 | 5/1996 | Fujita et al. | 365/229 |
| 5,524,096 | 6/1996 | Roohparvar | 365/194 |
| 5,559,742 | 9/1996 | Lee et al. | 365/200 |
| 5,638,386 | 6/1997 | Tsunoda et al. | 371/40.1 |

*Primary Examiner*—Stephen M. Baker
*Attorney, Agent, or Firm*—Schwegman, Lundberg, Woessner & Kluth

[57] ABSTRACT

A nonvolatile memory system emulates a magnetic hard disk drive and includes an array of nonvolatile memory cells, such as flash memory cells, organized into sets, such as sectors. A buffer, such as a random access memory, stores a first set of data to be written to the array. Error correction code (ECC) circuitry receives the first set of data and calculates first ECC check bits representative of the first set of data. ECC comparison circuitry compares the first ECC check bits with second ECC check bits representative of a second set of data stored in the array to generate an ECC comparison signal having a first state indicative of a match between the first and second ECC check bits and a second state indicative of a miscomparison between the first and second ECC check bits.

49 Claims, 4 Drawing Sheets

WRITE REDUCTION IN FLASH MEMORY SYSTEMS THROUGH ECC USAGE

THE FIELD OF THE INVENTION

The present invention relates generally to memory systems employed in computer systems, and in particular to nonvolatile memory systems, such as flash memory systems designed to emulate magnetic disk drive systems.

BACKGROUND OF THE INVENTION

It is conventional to implement a memory system in an integrated circuit including an array of nonvolatile memory cells, such as flash memory cells, and circuitry for independently erasing selected blocks of the nonvolatile memory cells. A flash memory array circuit includes rows and columns of nonvolatile flash memory cells. Thus, each of the cells or storage locations of the flash memory array circuit are indexed by a row index and a column index.

Each column of cells of the flash memory array include n memory cells with each cell being implemented with a floating-gate n-channel transistor. The drains of all transistors of a column are connected to a bit line, and the gate of each of the transistors is connected to a different word line. The sources of the transistors are held at a source potential, such as ground, during a read or programming operation. Each memory cell is a nonvolatile memory cell since the transistor of each cell has a floating gate capable of semipermanent charge storage. The current drawn by each cell depends on the amount of charge stored on the cell's floating gate. Thus, the charge stored on each floating gate determines a data value that is stored semipermanently in the corresponding cell. In a flash memory device, the charge stored on the floating gate of each cell is erasable by appropriately changing the voltage applied to the gate and source in a manner known in the art.

Typically, the cells of a flash memory array can be erased in blocks, such as boot blocks or sector-array blocks, or the entire integrated circuit chip can be erased at once using a bulk erase. Reads and writes are, however, typically performed on a random byte or word basis in conventional flash memory devices.

An example of a flash memory array is described in U.S. Pat. application Ser. No. 08/606,246, now U.S. Pat. No. 5,673,224, entitled "SEGMENTED NON-VOLATILE MEMORY ARRAY WITH MULTIPLE SOURCES WITH IMPROVED WORD LINE CONTROL CIRCUITRY," filed on Feb. 23, 1996 and assigned to the assignee of the present application, which is herein incorporated by reference.

Flash memory systems have been employed to emulate magnetic disk drive systems. Typically, the flash memory system is implemented as a card for insertion into a computer system with a chip set mounted on the card. The chip set includes an onboard control and several memory chips controlled by the controller. Each memory chip implements an array of flash memory cells organized into independently erasable blocks.

Magnetic hard disk systems have dominated storage media for computers and related systems due to the low cost and high capacity of available magnetic hard disk systems. Consequently, virtually all computer systems use and support magnetic hard disk technology. For example, the dominant computer operating system is the DOS or disk operating system, which essentially is a software package used to manage a magnetic hard disk system. The DOS software was developed to support the physical characteristics of hard drive structures based on a supporting file structure having heads, cylinders, and sectors to facilitate storing and retrieving of data from the magnetic hard disk drive.

Magnetic hard disk drives operate by storing polarities on magnetic material which can be rewritten quickly and as often as desired. As a result, DOS uses a file structure that stores files at a given location which is updated by a rewrite of that location as information is changed. Essentially all locations in DOS are viewed as fixed and do not change over the life of a disk drive. Locations are easily updated by rewrites of the smallest supported block of the structure or a sector. In magnetic disk drives, a sector typically is referred to as 512 bytes of data where each byte includes 8 bits of data. DOS also employs clusters as a storage unit, which are merely logical groupings of sectors to form a more efficient way of storing files and tracking the files with less overhead.

Development of flash memory integrated circuits has permitted a new technology to offer an alternative to magnetic hard disk drives and offer advantages and capabilities that are difficult to support by hard disk drive characteristics and features. The low power, high ruggedness, and small sizes offered by solid state flash memory systems make such flash memory systems an attractive alternative to a magnetic hard disk drive system. Although a memory system implemented with flash memory technology may be more costly than a magnetic hard disk drive system, computers and other processing systems are currently being developed that take advantage of flash memory features.

Flash memory systems that emulate the storage characteristics of a magnetic hard disk drive preferably are structured to support storage of 512 byte blocks or sectors along with additional storage for overhead associated with mass storage, such as error correction code (ECC) bits and/or redundant bits. Typically, the flash memory array is made to respond to a host processor in a manner that looks similar to a magnetic disk assembly so that the operating system can store and retrieve data in a known manner and be easily integrated into a computer system including the host processor.

One approach to make a flash memory easily integratable into a host computer is to configure the flash memory as a storage array, and to load special software into the host to translate conventional operating system commands, such as DOS commands, into flash commands and procedures for assertion to the flash memory. This approach uses the host computing power to act as a controller for utility that manages the flash memory rather than including such a controller in the flash memory itself.

A second approach to make a flash memory easily integratable into a host computer is to make the interface to the flash memory essentially identical to a conventional interface to a conventional magnetic hard disk drive. This approach has been adopted by the PCMCIA standardization committee which has promulgated a standard for supporting flash memory systems with a hard disk drive protocol. A flash memory card including one or more flash memory array chips and having an interface meeting this PCMCIA standard can be plugged into a host system having a standard DOS operating system with a PCMCIA-ATA (or standard ATA) interface. Such a flash memory card is designed to match standard interfaces, but must include an onboard controller which manages each flash memory array independent of the host system.

The second approach has several advantages. First, there are no special system requirements for the host system, which permits ease of host system design. No extra memory is required in the host, which allows for better use of the host memory. In addition, the flash memory system runs independently of the host to free the host computer to do other tasks while the flash memory is storing or retrieving data from a flash memory array. The second approach does, however, require a controller onboard the flash memory to implement the equivalent of an operating system behind the PCMCIA interface.

In flash memory systems other than disk-emulation flash memory systems, typically an entire memory is written or erased or an entire decode block is written or erased at one time. In a disk-emulation system, however, the data is typically very dynamic and small portions of memory, such as individual rows of flash memory cells, are rewritten many times while other small portions of memory remain unchanged. In updating data, the controller writes data to free locations, such as rows of flash memory cells, and the memory is updated by the controller writing the new or updated data to other free rows not previously written, marking the previously written rows as old or obsolete and ready to be erased. The flash memory system emulating the disk system keeps track of these obsolete rows and erases an entire erased block when it becomes filled or almost filled with obsolete rows. Updated data to replace data in one row of one erased block can be placed in another erased block or even another decode block or possibly even a different flash memory chip. The constant rewriting and moving of files results in erased blocks being constantly programmed and erased. With the DOS operating system, it is typical for new files to be updated heavily and unused files to be not updated or never changed once generated. This typical use of files results in portions of memory being updated frequently while other areas remain stagnant or unchanged.

A file of data to be written to cells of a flash memory system which emulates a magnetic disk drive system typically consists of sectors of data. During writing of a file to cells of such a system, each of the sectors of data is typically written to a different row of cells or to another distinct set of cells which has capacity to store a sector of data, and which is thus sometimes denoted as a "sector" of cells.

In a flash memory system, writes of data to flash memory cells are slow and they cause wear on the cells. This wear limits the useful life of conventional flash memory systems and reduces the system's overall reliability. There is a need in the art of flash memory systems which emulate magnetic disk drive systems and in other types of flash memory systems to reduce the number of writes to a flash memory array of cells that must be performed in order to keep the array updated.

SUMMARY OF THE INVENTION

The present invention provides a nonvolatile memory system including an array of nonvolatile memory cells organized into sets. Each set has sufficient memory cells to store a set of data. A buffer stores a first set of data to be written to the array. Error correction code (ECC) circuitry receives the first set of data and calculates first ECC check bits representative of the first set of data. ECC comparison circuitry compares the first ECC check bits with second ECC check bits representative of a second set of data stored previously in the array to generate an ECC comparison signal having a first state indicative of a match between the first and second ECC check bits and a second state indicative of a miscomparison between the first and second ECC check bits.

The first set of data is typically meant to be written to the array to replace the second set of data. One embodiment of the nonvolatile memory system includes a control engine that responds to the ECC comparison signal being in the second state to cause the nonvolatile memory system to write the first set of data from the buffer to the array. The control engine responds to the ECC comparison signal being in the first state to either prevent a write of the first set of data to the array or preferably to cause a comparator to compare the first set of data stored in the buffer with a second set of data stored in the array to generate a set comparison signal having a first state indicative of a match between the first and second sets of data and a second state indicative of a miscomparison between the first and second sets of data. In the preferred form of the invention, the control engine responds to the set comparison signal being in the first state to prevent a write of the first set of data to the array, and responds to the set comparison signal being in the second state to cause the nonvolatile memory system to write of the first set of data from the buffer to the array.

The nonvolatile memory cells are preferably flash memory cells. In addition, each set of flash memory cells typically includes a sector of cells to store a sector of data where a sector represents a quantity of data having the capacity of a sector of a conventional magnetic hard disk drive, such as 512 eight-bit bytes of data. In one form of the flash memory array, the array is organized into rows of cells, where each row of cells includes a sector of data plus extra bytes for ECC and overhead.

The buffer is preferably a random access memory (RAM), such as a synchronous RAM. The buffer is, however, alternatively embodied in an array of nonvolatile memory cells or some other memory circuit.

The present invention takes advantage of the characteristic of flash memory systems emulating magnetic hard disk drives that, in many cases, a file of new data to be written to the cells of a flash memory array correspond to a previously written file of "old" data, with many sectors of the new data being identical to corresponding sectors of the old data. The present invention provides an efficient method and circuitry for comparing new ECC check bits associated with data to be written to a set of cells of a flash memory array with ECC check bits associated with data already stored in the corresponding set of cells and writes the new data to the array only if the ECC check bits associated with the new data are not identical to the previously stored data check bits. In this way, the number of writes to a flash memory array is significantly reduced. By reducing the amount of writes to a flash memory array, there is less stress on the flash memory cells, which increases the operating life of the flash memory array and achieves better system reliability. In addition, system performance is greatly improved by reducing the time spent by the memory system in writing data to cells and reducing overall command overhead.

Specifically, the present invention performs a quick method of detecting if a file has been changed by calculating ECC check bits on incoming data and comparing these check bits against check bits stored in the flash memory array to check whether the data in the file has changed. The ECC method permits for a fast determination of whether the file has been changed and if the new data needs to be programmed to flash. The ECC method provides a fast method of making this determination and permits increased performance in a flash system. In addition, the ECC method reduces the average power consumed by the flash memory system and makes the flash memory system more reliable by reducing the number of times the memory is programmed over a given period of time.

In addition, because the present invention provides for calculation of an ECC code prior to storing data in the buffer, the buffer can be covered by the ECC. In this way, failed bits in the buffer can be detected and/or corrected.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The following described embodiments of the present invention are described as applied to flash memories similar in many respects to conventional flash memories, such as those commercially available from Micron Quantum Devices, Inc. of California. For clarity, only a portion of the well known circuitry of the flash memory described herein, while the new circuitry of the flash memory of the present invention is described in detail herein.

Computer System with Flash Memory System

Figure 1:
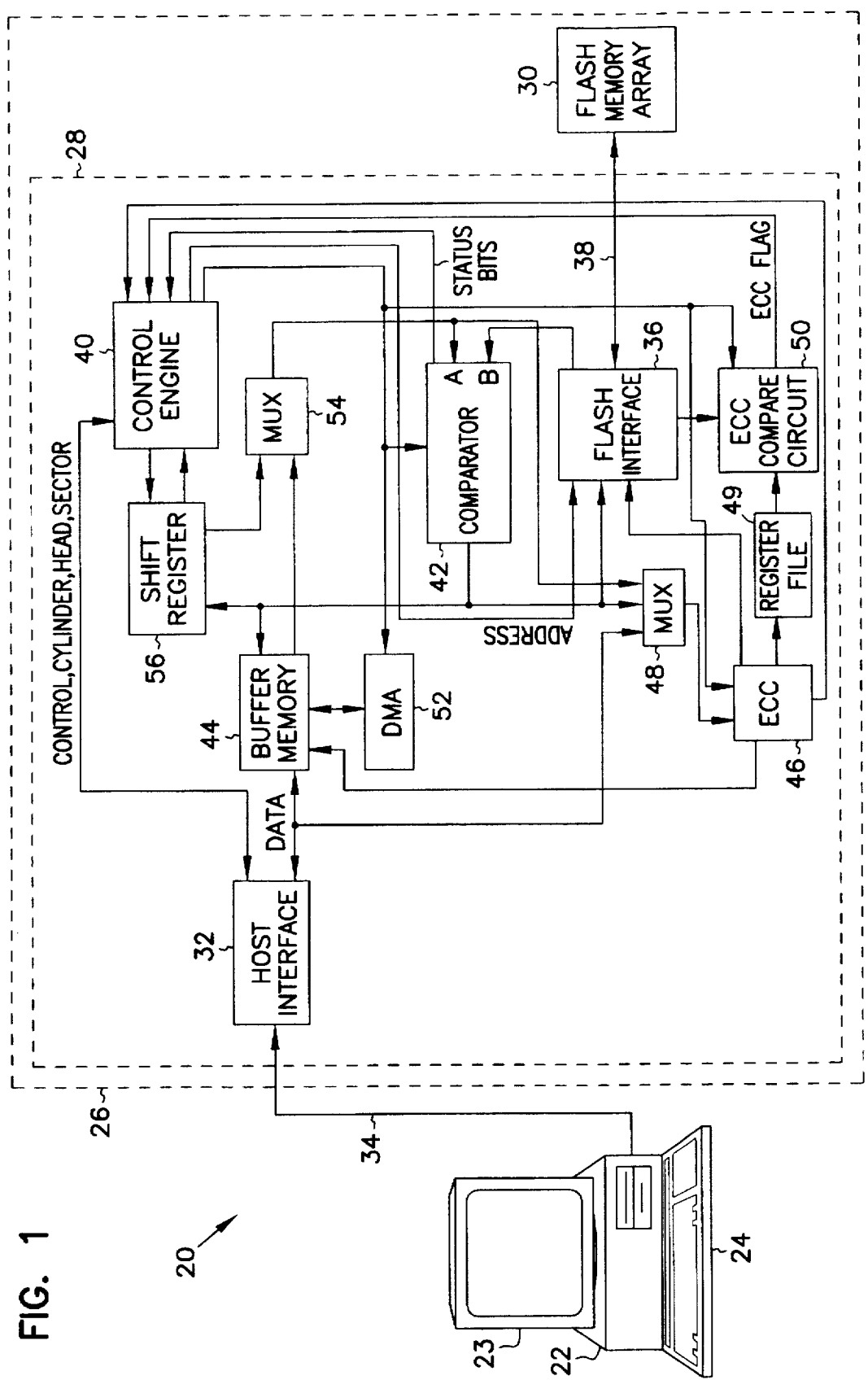
FIG. 1 is a block diagram of a computer system according to the present invention having a flash memory system which emulates a magnetic disk drive.

A computer system according to the present invention is illustrated generally at 20 in FIG. 1. Computer system 20 includes a host processor 22, an input device 24, such as a keyboard, and a flash memory system 26. Input device 24 can be manipulated by a human user to enter data and/or commands to processor 22. Flash memory system 26 is a memory subsystem of computer system 20 and replaces a conventional magnetic disk drive system or other memory subsystem. In one embodiment of flash memory system 26, the flash memory system is implemented in a single integrated circuit chip. In alternative embodiments of computer system 20, a flash memory system, such as memory system 26, is combined with at least one other memory subsystem, such as a conventional magnetic disk drive system. In addition, computer system 20 typically includes various other peripheral devices, such as a display device indicated at 23.

Flash memory system 26 includes a controller 28 and an array 30 of nonvolatile memory cells which are preferably nonvolatile flash memory cells. Controller 28 includes a host interface 32 which receives binary data and address bits from host processor 22 via a host bus 34 and sends binary data bits from memory array 30 to host processor 22 via host bus 34. In one embodiment of the present invention, host processor 22 is programmed with a standard DOS operating system and includes a PCMCIA-ATA interface of the type discussed in the Background of the Invention. In this embodiment, host interface 32 complies with the PCMCIA-ATA standard and can communicate with the standard PCMCIA-ATA interface of host processor 22.

Figure 2:
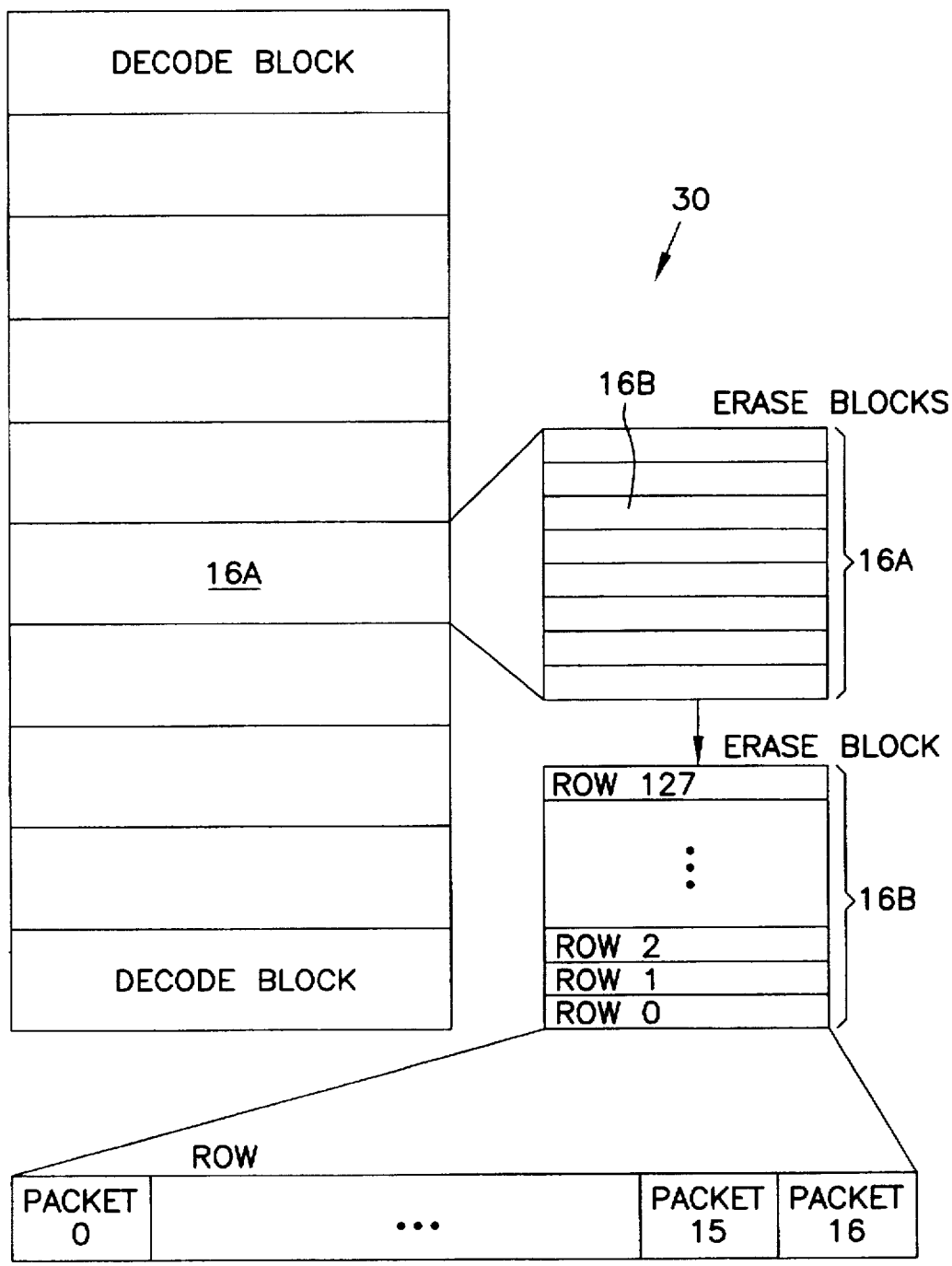
FIG. 2 is a diagram of one organization of cells of a flash memory array employed in a flash memory system.

A preferred embodiment of flash memory array 30 is diagrammatically illustrated in FIG. 2 to illustrate one organization of a flash memory array suitable for the present invention or other flash memory system which emulates a magnetic disk drive. The flash memory array 30 structure illustrated in FIG. 2 is suitable for low-cost applications of the type commonly implemented using low-cost magnetic disk drives. Memory array 30 includes 544 bytes per row of cells, where each byte includes 8 bits, and each memory cell is capable of storing at least one bit. In some embodiments of the present invention, each memory cell stores multiple bits through multi-state storage. Thus, each row of cells is equivalent to a magnetic disk sector of 512 bytes of data plus 32 bytes of overhead.

For specificity, at various points the detailed description describes embodiments in which a "sector" of new data in a buffer memory is written to a "sector" of cells of a flash memory array. However, it is contemplated that in other embodiments, a set of new data (not necessarily a "sector" of new data) in a buffer memory is written to a set of memory cells of a flash memory array (not necessarily to a "sector" of such cells).

Flash memory array 30, as illustrated in FIG. 2, is partitioned into large "decode blocks" of cells, such as indicated at 16A. There are ten large decode blocks illustrated in FIG. 2 that are physically isolated from one another. This partitioning of blocks permits defects in one decode block, such as decode block 16A, to be isolated from the other decode blocks in the array. Partitioning also allows defective decode blocks to be bypassed by controller 28, allows for high usage of die, and enhances overall yield of the silicon produced to drive down the cost of flash mass storage systems.

The term "decode block" is specifically used to denote a block of cells of flash memory array 30 which are sufficiently physically isolated from the other cells of the array so that the disturb effect on the cells in the decode block due to high voltage application to other cells of the array during erasing or programming of the other cells is negligible. In one embodiment of flash memory array 30, an entire memory array is a single decode block. More typically, a memory array includes two or more decode blocks.

As illustrated in FIG. 2, each decode block is subdivided into eight independently erasable blocks, sometimes referred to as erase blocks, such as indicated at 16B. Each erase block, such as erase block 16B, includes rows of flash memory cells, with each row being capable of storing 17 packets of bits with each packet including 32 bytes of data. Thus, each row is capable of storing 544 bytes corresponding to one conventional disk sector comprising 544 bytes, having 512 bytes of user data as well as a field of 32 overhead bytes. The overhead bytes include error correction code bytes for use in error detection and/or correction and other bits associated with sector management. Each erase block of FIG. 2 includes 128 sectors of data.

Each erase block, such as erase block 16B, can be independently erased in response to signals from controller 28. All flash memory cells in each erase block are erased at the same or substantially the same time, so that erasure of an erase block amounts to erasure of a large portion of flash memory array 30 at a single time.

Flash memory array 30, as illustrated in FIG. 2, is organized into erase blocks of cells, and each row of each erase block stores a quantity of bits which corresponds to a sector of a magnetic disk drive. Thus, each row is denoted as a sector of cells. In one such implementation, memory buffer 44 receives and stores a burst of 512 eight-bit bytes of new data from host interface 32. Each row of array 30 includes 4352 cells. Thus, each row can store the 4096 bits (512 bytes) of new data plus an additional 256-bit packet of "overhead" bits. In variations on the single chip embodiment of FIG. 1, array 30 and controller 28 are implemented in two or more separate chips. Array 30 can itself be replaced by an array implemented in one or more chips.

In reference to FIG. 1, controller 28 also includes a flash interface 36 which receives data to be written to flash memory array 30 and address bits from other elements of flash memory system 26 and provides corresponding data and address bits with appropriate timing and format to flash memory array 30 via a flash bus 38. Flash interface 36 also reads data bits from a selected sector of cells of flash memory array 30 via flash bus 38 and provides the data bits with appropriate timing and format to other elements of flash memory system 26.

Controller 28 also includes a control engine 40. Host interface 32 responds to control signals and address bits from host processor 22 to send address bits including bits identifying cylinder, head, and sector addresses to control engine 40 and asserts internal control signals to appropriate components of controller 28 including control engine 40 as required to implement each memory operation specified by each control signal from host processor 22. Examples of such memory operations are a read of some or all of the cells of flash memory array 30, an erase of one or more erase blocks of flash memory array 30, or a write of data to some or all cells of flash memory array 30. In response to the address bits, control engine 40 generates translated address bits and sends the translated address bits to flash interface 36. Among the internal control signals asserted by host interface 32 are enable/disable signals as well as presets which are asserted from control engine 40 to a comparator circuit 42 at appropriate times.

Data to be written to flash memory array 30 is received at host interface 32, and written from host interface 32 to a buffer memory 44. Buffer memory 44 is preferably a synchronous random-access memory (SRAM) circuit, but is alternatively an array of nonvolatile memory cells or some other memory circuit. Buffer memory 44 has capacity to store at least a sector of data. In one embodiment, multiple sectors of data are stored in corresponding multiple sector buffers in buffer memory 44. The overhead bytes are typically not stored in buffer memory 44 and are instead generated by controller 28.

Preread Comparison Circuitry

A preferred embodiment of comparator circuit 42 is described in detail in co-pending U.S. Pat. application Ser. No. 08/689,369, entitled "SYSTEM AND METHOD WHICH COMPARES DATA PREREAD FROM MEMORY CELLS TO DATA TO BE WRITTEN TO THE CELLS," filed on Aug. 8, 1996 ("PREREAD patent application") and assigned to the assignee of the present application, and which is herein incorporated by reference. The PREREAD patent application also describes some standard operations of a conventional integrated circuit flash memory chip which are known in the art of flash memory design and which are, therefore, not described herein.

The PREREAD patent application describes a computer system where a byte-to-byte preread compare operation is performed. This type of preread operation can also be performed with computer system 20 of the present invention. In such a preread operation, controller 28 issues a control signal to force a register (not shown) in comparator 42 to a reset state. Controller 28 then fetches a byte of data from flash memory array 30 and a corresponding byte of data from buffer memory 44 and compares corresponding bits of each byte to determine if all bits of each byte match each other. In other words, comparator 42 determines if the byte read from flash memory array 30 is identical to that read from buffer memory 44. After determining that a byte compares, controller 28 fetches the next sequential byte of data from flash memory array 30 and the next byte of data from buffer memory 44, and again repeats the byte compare operation to generate a compare condition. If any of the bytes of data read from flash memory 30 mis-compares with a corresponding one of the bytes of write data in buffer memory 44, a register (not shown) in comparator 42 becomes set and remains set to indicate a mis-compare has occurred regardless of any further clocking. Controller 28 monitors this register of comparator 42 and aborts the compare operation as soon as a mis-compare status is detected.

Aborting the byte compare operation when a mis-compare is detected results in saved overhead time avoiding wasted time in clocking to the end of the sector. This translates to performance savings to the system. If a mis-compare is detected, the controller can generate the necessary control signals to write the new set of data in buffer memory 44 to a new or erased sector of flash memory array 30. Controller 28 can also mark the sector just read from flash memory 30, which has been found to mis-compare, to an obsolete state.

As described in the PREREAD patent application, if the preread compare operation has compared all bytes of the sector and found no mis-compare between any byte read from flash memory array 30 and a corresponding byte read from buffer memory 44, the value of the sector stored in buffer memory 44 is of identical value to the sector stored in flash memory array 30, and there is no need to write the new sector to flash memory array 30. Thus, in this case, the sector residing in flash memory array 30 is left unchanged and host processor 22 is notified that the sector write is complete.

This bypass of a write operation described in the PREREAD patent application achieves significant time savings, since flash writes are slow compared to reads. A flash write of a sector can take 1–5 milliseconds while a read compare on a byte-by-byte basis takes approximately 50 microseconds. Thus, a large savings of time is gained when a sector is not required to be written to flash memory array 30. Nevertheless, if all the data in a file is changing such that each compare operation performed on a sector from flash memory array 30 and a new sector of the file from buffer memory 44 determines that the two sectors are not identical, the compare operation results in unnecessary overhead that degrades system performance. Two ways of reducing the magnitude of this problem are described in detail in the PREREAD patent application.

ECC Comparison Circuitry

Another way of preventing unnecessary overhead from degrading system performance according to the present invention is to perform an error correction code (ECC) comparison instead of or prior to a byte-by-byte comparison. ECC circuitry 46 receives data via a multiplexer 48 prior to being provided to flash interface 36. ECC circuitry 46 generates check bits or a residue code to be stored in flash memory array 30 along with the data itself. A suitable ECC code is a distance-7 Reed Solomon ECC. Of course, any suitable error correction code can be used according to the present invention depending on the design requirements of the given flash memory array system to be used in computer system 20.

In the present invention, ECC circuitry 46 calculates ECC check bits on the incoming sector of data as the data is being written to buffer memory 44 from host interface 32. Thus, a path is provided directly from host interface 32 via multiplexer 48 directly to ECC circuitry 46. In addition, a return path from ECC circuitry 46 is provided back to buffer memory 44.

When a sector of data is received and stored in buffer memory 44, ECC circuitry 46 calculates a remainder or other suitable check bits which are essentially unique for that sector of data. The check bits from the incoming sector of data are provided from ECC circuitry 46 to a register file 49 which stores the check bits. Register file 49 provides the stored check bits to an ECC compare circuit 50. In addition, controller 28 fetches the ECC check bits from flash memory array 30 through flash interface 36 to also be provided to ECC compare circuit 50. ECC compare circuit 50 operates to check all the bytes of the check field and provides an ECC flag signal to control engine 40 which indicates whether the check bits stored in array 30 match the newly calculated check bits for the incoming data stored in register file 49. A rewrite of the file in flash memory array 30 is not required if the ECC check bits in flash memory array 30 match the ECC check bits calculated for the incoming sector of data. If there is a mis-compare between the check bits of flash memory array 30 and the check bits calculated for the incoming sector of data, the ECC flag signal indicates that a write of new data is required.

Control engine 40 responds to the ECC flag signal from ECC compare circuit 50 to control whether or not the new sector of data needs to be written into flash memory array 30. If the check bits do not compare, then the data now stored in buffer memory 44 is written to flash memory cell array 30 and the previous sector of data in the flash memory cell array 30 is discarded.

If the check bits do compare, one embodiment of the present invention provides that this comparison is sufficient to prevent a write to flash memory array 30 and to notify host processor 22 that the write is complete. Nevertheless, the preferred form of the present invention signals control engine 40 to perform a byte-by-byte comparison through comparator 42 as described above when all check bits compare as indicated by the ECC flag signal from ECC compare circuit 50. This additional check of all bytes by comparator 42 guarantees that the file in flash memory array 30 matches the file data now stored in buffer memory 44 to assure that there is no need to write the new sector to array 30.

Because ECC circuitry 46 generates the error correction code syndrome bits before the data is written into buffer memory 44, the controller 28 according to the present invention provides for correcting a failed or bad bit in buffer memory 44. ECC circuitry 46 receives the sector of data from host interface 32 to be written into flash memory 30 and calculates ECC check bits representative of the sector of data before or during the sector of data being written to the buffer memory 44. If the sector of data stored in buffer memory 44 is actually written into flash memory 30 as a result of a miscompare indicated by ECC compare circuit 50 and comparator 42, the stored ECC check bits held in register file 49 are written into flash memory array 30 along with the sector of data being written into flash memory array 30 from buffer memory 44. Thus, buffer memory 44 errors are written to flash memory 30 along with the check bits calculated on the good incoming data before the data is loaded into buffer memory 44. The buffer memory errors are detected and/or corrected on subsequent reads of the data from flash memory 30. If ECC circuitry 46 detects an error, a flag is raised to control engine 40. Control engine 40 ascertains if the error is a correctable error, locates the proper byte in buffer memory 44 and corrects this byte with a correction vector. The corrected data is then provided to host processor 22 via host interface 32.

As to the comparison performed by ECC compare circuit 50, a bad memory location stored in flash memory 30 still results in a matched comparison if the new incoming data matches the previous data before it was stored into buffer memory 44 and written into flash memory 30 because the check bits calculated by ECC circuitry 46 based on the incoming data and the ECC check bits stored in flash memory 30 match. The bad data stored in flash memory 30 is corrected when the bad data is actually read from the flash memory 30 and ECC circuitry 46 generates an error syndrome based on the read bad data and the ECC check bits from the flash memory.

As described above, register file 49 stores or holds the ECC check bytes after ECC circuitry 46 calculates the check bytes for a first sector of data stored in buffer memory 44. The ability to hold the check bytes in register file 49 frees ECC circuitry 46 to receive a next sector of data from host interface 32 and to calculate ECC check bytes representative of the next sector of data. Thus, the next sector of data to be written is sent while controller 28 reads the check bytes from register file 49 corresponding to the first sector. Therefore, register file 49 permits the comparison between the check bytes representing the first sector of data with check bytes representing a corresponding sector stored in flash memory array 30 to be performed while the next sector of data is being received into another address space in buffer memory 44.

When one sector buffer of data is received by buffer memory 44, control engine 40 causes the check bits from ECC circuitry 46 to be loaded into register file 49 and initializes ECC circuitry 46. Control engine 40 then activates host interface 32 to indicate that another sector of data can be sent from host processor 22. While the new sector of data is being transferred from host processor 22 to buffer memory 44 via host interface 32, controller 28 reads the check bytes stored in flash memory array 30 and ECC compare circuit 50 compares the check bytes from register file 49 with the check bytes read from flash memory array 30.

Register file 49 is optionally eliminated at the cost of losing the increased performance obtained with the ability to receive the next sector of data while the ECC comparison is performed for the first sector of data. If register file 49 is eliminated the ECC circuitry 46 must buffer the calculated ECC check bits. One alterative embodiment of flash memory system 26 includes two ECC blocks of ECC check bytes which alternate between being the ECC block for the newly calculated check bytes corresponding to the newly received sector of data from host interface 32 and being the ECC block employed for the ECC comparison operation for the sector of data to be written to flash memory array 30.

As mentioned above, a byte-by-byte comparison performed by comparator 42 takes approximately 50 microseconds. By contrast, the ECC compare circuit 50 performs the ECC compare in approximately 100 nanoseconds for each of the eight ECC bytes for a total time of approximately 800 nanoseconds. Thus, the ECC comparison operation according to the present invention permits a fast determination of whether a file has been changed and if new data needs to be programmed into flash memory array 30. The ECC check operation provides a faster operation of making this determination as compared to a byte-to-byte comparison by comparator 42 and accordingly allows for increased performance in the flash memory system according to the present invention. In addition, the benefits of reducing the average power of the flash memory system and making the flash memory system more reliable by reducing the number of times the memory is programmed over a given time period are also obtained with the present ECC compare operation according to the present invention. Furthermore, the amount of data read is reduced which also reduces power consumption.

Thus, the present invention significantly reduces the drawbacks of some flash memory systems which emulate magnetic disk drives where the flash memories are typically slow programming and have increased power consumption when programming, since with the present invention, significantly less programming is necessary. In addition, when all the data in a file is changing because comparisons indicated by ECC compare circuit 50 indicate that the check bits stored in flash memory array 30 and the check bits generated on the incoming sector of data are not identical, the 50 microseconds to make the comparison with comparator 42 is essentially eliminated by reducing the overhead to approximately 800 nanoseconds. Thus, with the present invention, when all the data in the file is changing, the degradation in system performance of computer system 20 due to the ECC comparison is essentially insignificant.

The compare operation performed by ECC compare circuit 50 is essentially a byte comparison of eight bytes of ECC check bits generated on the incoming data from host processor 22 and eight bytes of ECC check bits from flash memory array 30. Thus, ECC compare circuit 50 is optionally eliminated as comparator circuit 42 can be employed to perform the byte comparison of the ECC check bits and correspondingly generate the ECC flag signal. In this form of the invention, data must be properly fed into comparator 42 to avoid conflicts through proper multiplexing and/or 3-state buses.

Detailed Operation of Flash Memory System

Typically, the control signals and address bits received at host interface 32 from host processor 22 indicate one or more sectors of flash memory array 30 are to be updated with new data also received from host processor 22 or from a memory controlled by host processor 22. In response to the internal control signals and address bits asserted by host interface 32 based on the control signals and address bits received from host processor 22, controller 28 writes each sector of the data to a "free" sector, such as a row, of array 30 which corresponds to the sector and cylinder and head specified by host processor 22 (or controller 28 determines that there is no need to perform such a write, in accordance with the present invention as described above).

When controller 28 determines that a previously written sector of array 30 needs to be updated with new data received from host processor 22, controller 28 causes flash memory system 26 to execute the following operations.

Controller 28 causes flash interface 36 to write the new data to a "free" sector of array 30, which is an array sector other than the previously written sector to which data has not been written since the last erase of the entire erase block containing the erase sector. Controller 28 marks a previously written sector as old (i.e., obsolete and ready to be erased). Typically, controller 28 also asserts a confirmation signal to host interface 32 to be relayed to the host to confirm that the requested write operation has been performed.

Control engine 40 is preferably programmed in accordance with the present invention to assert such a confirmation signal even when it has prevented a write of the updating data to array 30 after controller 28 has determined that there is no need for such a write because the updating data is identical to the previously written data which the updating data is intended to replace, because ECC compare circuit 50 and comparator 42 have determined that the new data in buffer memory 44 is identical to the previously stored data in array 30. Controller 28 is programmed to keep track of the obsolete sectors of array 30 to cause the erasing of an entire erase block when the block becomes filled or almost filled with obsolete sectors. Controller 28 can cause the new data from the host processor 22 to be written to another erase block or even another decode block or possibly even a different flash memory chip.

Control engine 40 asserts control signals to other elements of controller 28 including flash interface 36 to cause controller 28 to execute operations in accordance with the present invention. Control engine 40 determines which set of suboperations or functions need to be performed to implement the memory operations specified by host processor 22. Examples of such suboperations or functions are a write of data from buffer memory 44 to array 30 or a read of data from array 30 to buffer memory 44. One embodiment of control engine 40 includes a microcontroller which performs the high-level operations, such as a command and status handshaking with the host processor 22 via host interface 32. This microcontroller is responsible for locating the proper memory location within array 30 from a given cylinder, head and sector address from the host processor 22. While such a microcontroller can be programmed to efficiently handle such activities, the microcontroller typically is too slow to control the real-time operations of managing the data flow and flash interface gating.

Because of the performance limitations of the microcontroller, a specifically designed sequencer is optionally included in control engine 40 to control the real-time functions of the flash data gating and flash interface control. In an implementation using a microcontroller and a specifically designed sequencer, the microcontroller typically acts as the master to the slave sequencer. The microcontroller activates the sequencer to do specific functions in response to the microcontroller's commands. In this environment, the sequencer is given commands such as a read sector command, write sector command, or erase a block command. The locations of a cell of array 30 to which these operations are to be performed are provided to the sequencer from the microcontroller. A variety of structures of microcontroller and sequencer logic are possible for control engine 40, but the overall methodology preferably resembles the structures employed by conventional magnetic hard disk drives.

An alternative embodiment of control engine 40 includes a single reduced instruction set computer (RISC) or a digital signal processor (DSP) in place of the microcontroller and sequencer. Use of such a RISC processor provides the speed required which is otherwise achieved with the sequencer. In addition, the high-level intelligence required is also achieved. The use of such a RISC processor simplifies the design and shifts the development burden into a firmware design. This approach also increases the flexibility available for design changes to firmware and possibly reduces costs where a small RISC processor core replaces large blocks of logic.

With reference to FIG. 1, flash memory system 26 operates as follows when a sector of new data to be written to a sector of array 30 has been stored in buffer memory 44. Control engine 40 controls a direct memory access (DMA) circuit 52 to set the DMA pointer to the start of a sector to control the providing of bytes of data to comparator 42 via multiplexer 54. The operation of a similar DMA controller is described in detailed in the PREREAD patent application.

Shift register 56 is optionally employed to store temporarily one or more overhead bits, to be written to array 30 for use in subsequent processing of data bits to be written from buffer memory 44 to array 30 for use in subsequent processing of data bits to be written from buffer memory 44 to array 30. Also, overhead bits read from array 30 can be stored in shift register 56 for use at appropriate times during processing of corresponding data read from array 30. Preferably, control engine 40 is capable of monitoring the contents of shift register 56 and shifting the contents of register 56 by sequencer control to assert from register 56 selected overhead bits corresponding to any selected packet of a sector of data to be read from array 30 or to be written to array 216.

Also preferably, control engine 40 can alter the length of each DMA transfer to fit the desired volume of data to be written to array 30 (i.e., the size of each sector, packet, or other quantity of data asserted from buffer memory 44 is preferably controllable). Preferably, control engine 40 can alter the DMA address to allow multiple reads (rereads) of the same quantity of data from buffer memory 44 during a DMA transfer operation.

After an entire sector of data in buffer memory 44 has been processed in accordance with the invention, the sequencer within control engine 40 selects shift register 56 as a data source. At this point, shift register 56 contains overhead bits corresponding to the sector of data written to array 30, typically because controller 28 has gather replacement bits for defective locations, defect bits, and system flags for the sector of data to be written to shift register 56 as a set of overhead bits for the sector. The overhead bits are sequentially provided (as a sequence of eight-bit words) from shift register 56 through multiplexer 54 and comparator 42 to flash interface 36, and are then written to cells of array 30. In the embodiment of array 30 illustrated in FIG. 2 each row of array 30 includes 4352 cells capable of storing sixteen 256-bit packets of data plus an additional 256-bit packet of overhead bits. Thus, in this embodiment, a sector of data (4096 bits) is written to a single row of array 30, and a packet of 256 overhead bits from shift register 56 are also written to the same row of array 30.

To read a sector of data from array 30, flash memory system 26 operates as follows. The sequencer within control engine 40 causes flash interface 36 to read the overhead bits from the sector from array 30 and provide the bits through comparator 42 to shift register 56, and/or to ECC circuit 46, and/or to ECC compare circuit 50. Control engine 40 then sets the DMA address to the start of the sector, and causes DMA circuit 52 and flash interface 36 to execute a DMA operation in which the first packet of bits (e.g., the first 32 bytes) is read from array 30, provided from interface circuit 36, and written from the comparator circuit 42 to buffer memory 44 and through multiplexer 48 to ECC circuit 46. Control engine 40 monitors the DMA operation for completion of the packet transfer to buffer memory 44.

Upon completion of the packet transfer, control engine 40 causes another DMA operation to be performed to read the next packet from array 30 and write the packet to buffer memory 44. This sequence of steps is repeated for each packet of the sector to be read from array 30, until all packets of the sector have been read from array 30 and written to buffer memory 44.

The ECC code for the sector, which are a subset of the overhead bits previously read from array 30, are reread and checked, under control of control engine 40, to determine if there is any detectable error in the data in buffer memory 44. If no error is detected, the data is transferred from buffer memory 44 through host interface 32 to host processor 22.

When flash memory system 26 operates in a write mode in which it writes data from buffer memory 44 to array 30, the data being written (or to be written) to array 30 has its corresponding check bits stored in register file 49. The check bits are written from register file 49 to flash memory array 30 at the end of the data transfer via flash interface 36.

When flash memory system 26 operates in a read mode in which it reads data from array 30, flash interface 36 provides the data (and corresponding check bits) which it reads from array 30 through compare circuit 42 and multiplexer 48 to ECC circuit 46. In this mode, ECC circuit 46 processes the check bits and data to identify errors in the data, and ECC circuit 46 asserts appropriate signals to control engine 40 (e.g., signals indicative of syndrome bits) as a result of this operation. ECC circuit 46 thus performs error detection on the data read from array 30. Control engine 40 reads the syndrome bits from ECC circuit 46 and calculates a correction vector based thereon in a well-known manner. Once the correction vector and displacement are known, control engine 40 alters the data in buffer memory 44 to correct at least one detected error therein. The corrected data will then be sent to host processor 22 via host interface 32.

In some embodiments, to read a set of data bits, and any corresponding overhead bits for the set, from a sector of flash memory array 30, controller 28 of flash memory system 26 identifies the location where the set of data is stored and reads any corresponding overhead bits (typically stored in a sublocation distinct from that where the data of interest is stored). Controller 28 stores and/or processes the overhead bits. Then, the first subset of the set of data is then DMA gated from array 30 and written into buffer memory 44. The next subset of the set of data is then DMA gated from the flash memory array and written into the buffer memory 44, and this process repeats until all subsets of the set of data have been read from array 30 and written to buffer memory 44. After the entire set of data has been stored in the buffer memory 44, ECC circuit 46 preferably performs error detection (using ECC check bits read from the flash memory array), and if the data is found correct controller 28 causes the data to be sent from buffer memory 44 to host processor 22 via host interface 32. Reads of different locations (e.g., sectors) of flash memory array 30 proceed with this same procedure until data from all desired locations has been sent to host processor 22. When all the data has been sent to host processor 22, the read operation is complete. If ECC circuitry 46 detects an error, a flag is raised to control engine 40. Control engine 40 ascertains if the error is a correctable error, locates the proper byte in buffer memory 44 and corrects this byte with a correction vector. The corrected data is then provided to host processor 22 via host interface 32.

Control engine 40 is preferably programmed with software for implementing the invention as described above. Throughout the specification, the expression that a device is "programmed with software" for performing an operation in accordance with the invention is used in a broad sense to denote that the device includes software, firmware, or dedicated hardware which gives the device the capability of performing the operation. Also throughout the specification, the term "circuitry" is used to denote any hardware comprising active and/or passive electrical components, such as semiconductor devices, tubes, resistors and the like, whether or not such hardware is programmed with software (unless the term "circuitry" is qualified to refer to a narrow class of such hardware). A general purpose processor which includes transistors or other electrical components and which is programmed with software causing the processor to process electrical signals (indicative of binary data) that it receives in accordance with an algorithm is an example of "circuitry" within the scope of this definition.

As illustrated in FIG. 1, controller 28 includes hardware as specified. It is contemplated that in alternative embodiments, controller 28 can be a general purpose processor (including a memory) which is programmed with software enabling the processor to perform an operation in accordance with the invention (e.g., in response to external signals from host processor 22 specifying operations on flash memory array 30).

Multi-Chip Flash Memory System

Although controller 28 is a component of the same integrated circuit as flash memory array 30 as described above for the embodiment of the present invention illustrated in FIG. 1, in other embodiments of the invention the controller and flash memory array are implemented in distinct chips. For example, one form of the present invention is embodied in a chip set (such as that shown in FIG. 3) which includes a controller chip and two or more memory array chips, each of which operates under control of the controller chip. Such a chip set can be implemented to emulate a magnetic disk drive with the controller chip operating in response to commands received from a remote host. The controller in this embodiment is capable of performing a memory operation on any selected one of the memory array chips. For example, when instructed to write a sector of data to nonvolatile memory cells of a selected one of the memory array chips, the controller compares the sector to a previously stored sector of data read from the selected memory array chip in accordance with the invention, and either writes the sector of data to the selected memory array chip or generates a confirmation signal indicating that the sector has been written to selected memory array chip without actually writing the sector to the chip (depending on the outcome of the ECC check bit comparison and possible byte by byte comparison).

Figure 3:
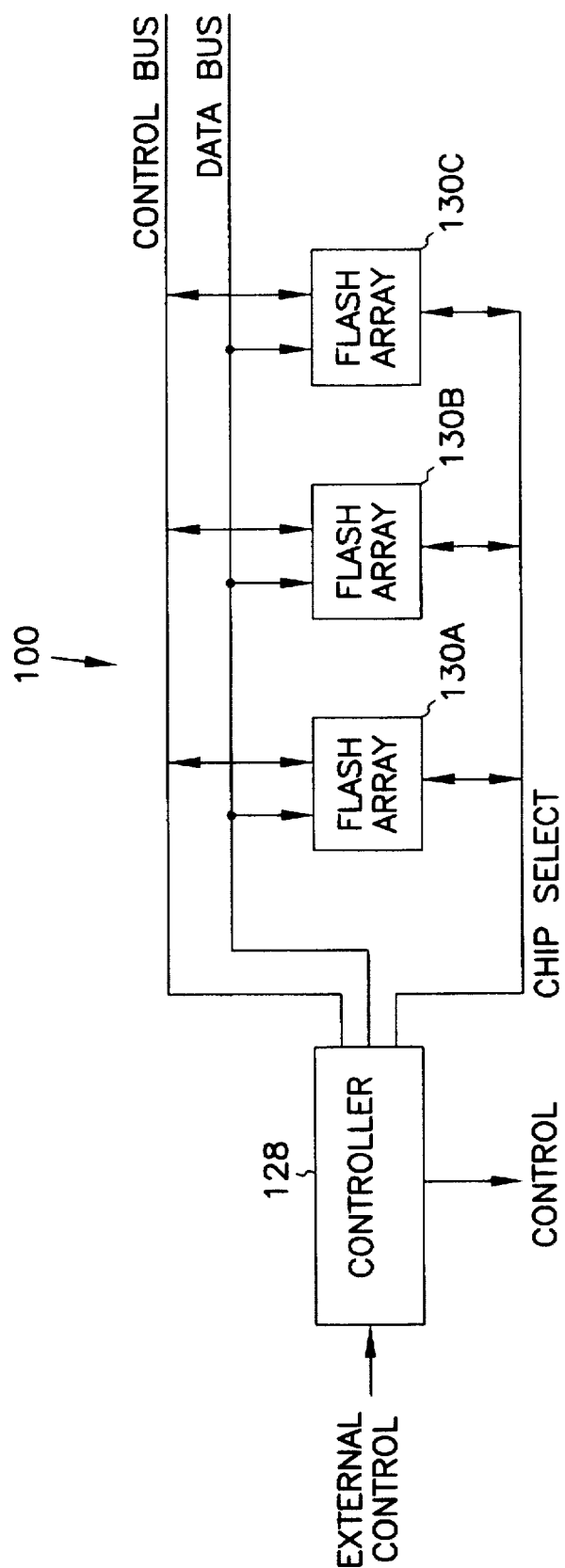
FIG. 3 is a block diagram of an alternative embodiment of a flash memory system according to the present invention which includes several flash memory arrays.

A multi-chip flash memory system according to the present invention is illustrated generally in block diagram form at 100 in FIG. 3. Multi-chip flash memory system 100 includes identical nonvolatile memory arrays 130A, 130B, and 130C (each implemented as a separate integrated circuit) and a controller 128. Each cell of each of arrays 130A, 130B, and 130C are preferably a flash memory cell. Also preferably, each of arrays 130A, 130B, and 130C comprises at least one decode block of flash memory cells. Each decode block includes a number of erase blocks, such as illustrated in FIG. 2 for array 30. Each erase blocks includes at least one row of cells. Controller 128 is programmed to control memory operations of any selected one or arrays 130A, 130B, and 130C, and to process a sector of data to be written to any selected one of arrays 130A, 130B, and 130C in accordance with the invention. Controller 128 includes hardware and/or software for selecting one of the flash memory arrays.

Flash Memory System External Controller and Microcontroller

Figure 4:
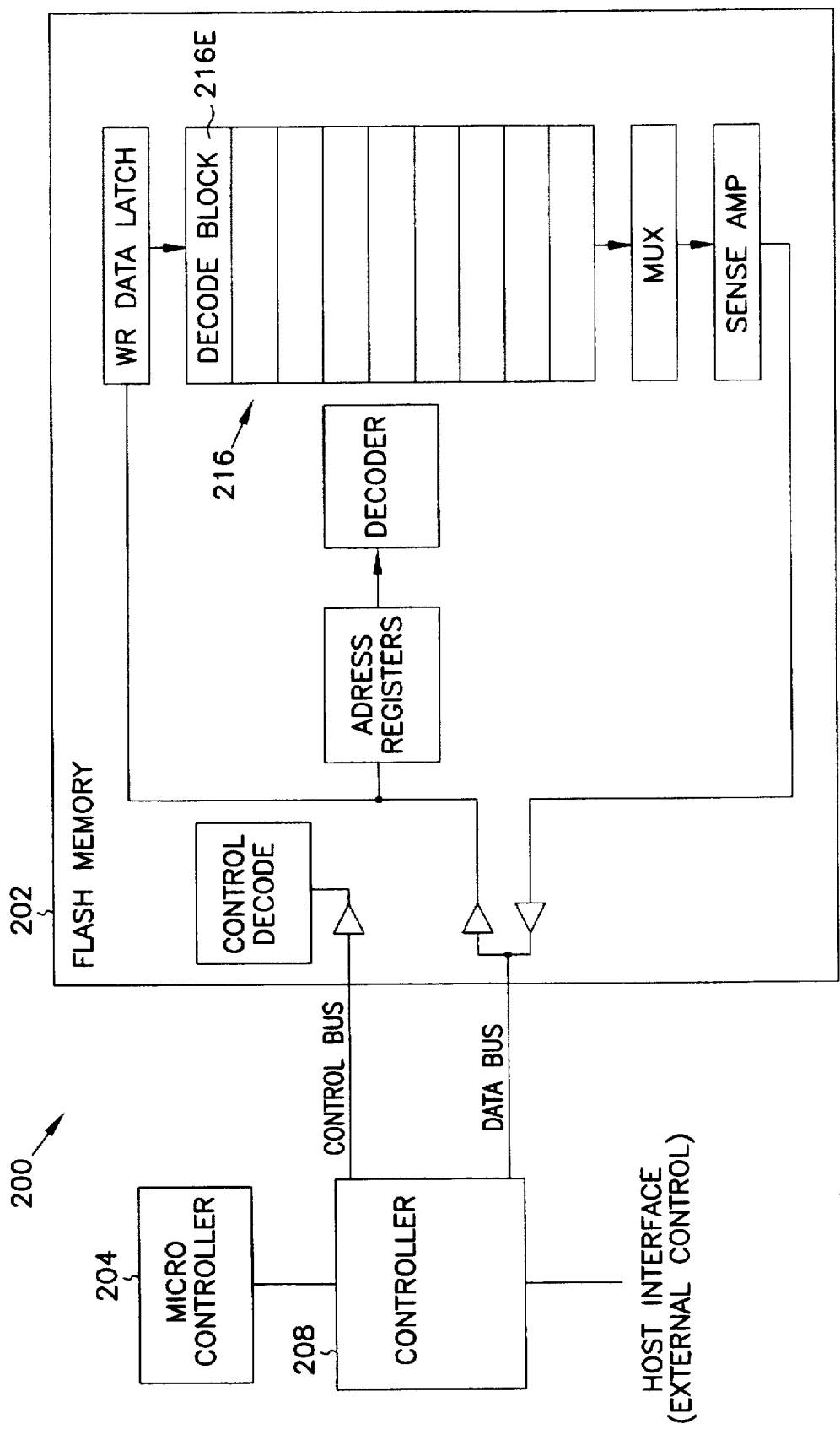
FIG. 4 is a block diagram of an alternative embodiment of a flash memory system according to the present invention which is controlled by an external controller and microcontroller

Another embodiment of a flash memory system of the present invention is illustrated generally in block diagram form at 200 in FIG. 4. Flash memory system 200 includes a flash memory chip 202 controlled by an external controller chip 208. Flash memory chip 202 includes an array 216 of flash memory cells, and array 216 includes of decode blocks of cells, such as decode block 216E. Controller 208 operates with microcontroller chip 204. In FIG. 4, chips 204 and 208 together perform the function of controller 28 of the FIG. 1 embodiment. Flash memory chip 202 of FIG. 4 need not include control logic circuitry of the type included in controller 28 of memory chip 26 of FIG. 1. Instead, controller 208 of FIG. 4 includes hardware and software for controlling memory operations of chip 202 and for implementing the above described features of the present invention.

Conclusion

All of the above described embodiments of the present invention significantly reduce the number of writes to a flash memory array of a flash memory system emulating a magnetic disk drive because in many cases, a file of new data to be written to the flash memory array corresponds to a previously written file of "old" data, with many sectors of the new data being identical to corresponding sectors of the old data. Flash memory systems 26, 100, and 200 according to the present invention provide an efficient method and circuitry for comparing new ECC check bits associated with data to be written to a set of cells of the flash memory array with ECC check bits associated with data already stored in the corresponding set of cells and writes the new data to the array only if the ECC check bits associated with the new data are not identical to the previously stored data check bits. By reducing the number of writes to the flash memory array, there is less stress on the flash memory cells, which increases the operating life of the flash memory array and achieves better system reliability. In addition, system performance is greatly improved by reducing the time spent by the memory system in writing data to cells and reducing overall command overhead.

As described in detail above with reference to flash memory system 26 illustrated in FIG. 1, controller 28 of flash memory system 26, controller 128 of flash memory system 100 and controller 208 and microcontroller 204 of flash memory system 200 quickly detect if a file has been changed by calculating ECC check bits on incoming data and comparing these check bits against check bits stored in the flash memory array to check whether the data in the file has changed. The ECC method according to the present invention permits for a fast determination of whether the file has been changed and if the new data needs to be programmed to flash. The ECC method provides a fast method of making this determination and permits increased performance in a flash system. In addition, the ECC method reduces the average power consumed by the flash memory system and makes the flash memory system more reliable by reducing the number of times the memory is programmed over a given period of time.

Moreover, the present invention provides for calculation of an ECC code prior to storing data in the buffer memory.

such as buffer memory 44 illustrated in FIG. 1. Consequently, the buffer memory is preferably covered by the ECC to detect and/or correct failed bits in the buffer memory in subsequent reads of data back from the flash memory array.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A nonvolatile memory system comprising:

an array of nonvolatile memory cells organized into sets, each set having sufficient memory cells to store a set of data;

a buffer for storing a first set of data to be written to the array; and error correction code (ECC) circuitry receiving the first set of data and calculating ECC check bits representative of the first set of data before or during the first set of data being written to the buffer.

2. The nonvolatile memory system of claim 1 wherein the nonvolatile memory cells comprise flash memory cells.

3. The nonvolatile memory system of claim 1 wherein each set of nonvolatile memory cells comprises a sector of cells to store a sector of data.

4. The nonvolatile memory system of claim 1 wherein the buffer comprises a random access memory.

5. The nonvolatile memory system of claim 1 further comprising a register file for receiving and storing the ECC check bits from the ECC circuitry.

6. A nonvolatile memory system comprising:

an array of nonvolatile memory cells organized into sets, each set having sufficient memory cells to store a set of data;

a buffer for storing a first set of data to be written to the array;

error correction code (ECC) circuitry receiving the first set of data and calculating first ECC check bits representative of the first set of data; and ECC comparison circuitry for comparing the first ECC check bits with second ECC check bits representative of a second set of data stored in the array to generate an ECC comparison signal having a first state indicative of a match between the first and second ECC check bits and a second state indicative of a miscomparison between the first and second ECC check bits.

7. The nonvolatile memory system of claim 6 wherein the first set of data is to be written to the array to replace the second set of data.

8. The nonvolatile memory system of claim 6 further comprising:

a control engine responsive to the ECC comparison signal being in the second state to cause the nonvolatile memory system to write the first set of data from the buffer to the array.

9. The nonvolatile memory system of claim 6 further comprising:

a control engine responsive to the ECC comparison signal being in the first state to prevent a write of the first set of data to the array.

10. The nonvolatile memory system of claim 6 further comprising:

comparator for comparing the first set of data stored in the buffer with a second set of data stored in the array to generate a set comparison signal having a first state indicative of a match between the first and second sets of data and a second state indicative of a miscomparison between the first and second sets of data;

a control engine responsive to the ECC comparison signal being in the first state to cause the comparator to compare the first set of data to the second set of data.

11. The nonvolatile memory system of claim 10 wherein the control engine is responsive to the set comparison signal being in the first state to prevent a write of the first set of data to the array.

12. The nonvolatile memory system of claim 10 wherein the control engine is responsive to the set comparison signal being in the second state to cause the nonvolatile memory system to write of the first set of data from the buffer to the array.

13. The nonvolatile memory system of claim 6 wherein the nonvolatile memory cells comprise flash memory cells.

14. The nonvolatile memory system of claim 6 wherein each set of nonvolatile memory cells comprises a sector of cells to store a sector of data.

15. The nonvolatile memory system of claim 6 wherein the buffer comprises a random access memory.

16. The nonvolatile memory system of claim 6 further comprising a register file for receiving and storing the first ECC check bits from the ECC circuitry.

17. A nonvolatile memory system comprising:

an array of nonvolatile memory cells organized into sets, each set having sufficient memory cells to store a set of data;

a buffer receiving and storing a first set of data to be written to the array;

error correction code (ECC) circuitry receiving the first set of data and calculating first ECC check bits representative of the first set of data before or during the first set of data being written to the buffer and detecting errors in the first set of data read from the array based on the first set of data after the first set has been written to and subsequently read from the array and the first ECC check bits after the first ECC check bits have been written to and subsequently read from the array; and interface circuitry providing the first set of data stored in the buffer and the first ECC check bits to the array for writing into the array and subsequently reading the first set of data from the array and the first ECC check bits representative of the first set of data read from the array.

18. The nonvolatile memory system of claim 17 wherein at least one of the detected errors is created by the buffer.

19. The nonvolatile memory system of claim 17 wherein the ECC circuitry further corrects certain errors in the first set of data read from the array.

20. The nonvolatile memory system of claim 19 wherein at least one of the certain errors is created by the buffer.

21. The nonvolatile memory system of claim 17 wherein the nonvolatile memory cells comprise flash memory cells.

22. The nonvolatile memory system of claim 17 wherein each set of nonvolatile memory cells comprises a sector of cells to store a sector of data.

23. The nonvolatile memory system of claim 17 wherein the buffer comprises a random access memory.

24. A method of operating a nonvolatile memory system having an array of nonvolatile memory cells organized into sets, each set having sufficient memory cells to store a set of data, the method comprising the steps of:

receiving a first set of data to be written to the array;

storing the first set of data in a buffer; and calculating ECC check bits representative of the first set of data before or during the first set of data being stored in the buffer.

25. A method of reducing the number of writes in a nonvolatile memory system having an array of nonvolatile memory cells organized into sets, each set having sufficient memory cells to store a set of data, the method comprising the steps of:

receiving a first set of data to be written to the array;

storing the first set of data in a buffer; and calculating ECC check bits representative of the first set of data; and comparing the first ECC check bits with second ECC check bits representative of a second set of data stored in the array to generate an ECC comparison signal having a first state indicative of a match between the first and second ECC check bits and a second state indicative of a miscomparison between the first and second ECC check bits.

26. The method of claim 25 wherein the first set of data is to be written to the array to replace the second set of data.

27. The method of claim 25 further comprising the step of:

causing the nonvolatile memory system to write the first set of data from the buffer to the array in response to the ECC comparison signal being in the second state.

28. The method of claim 25 further comprising the step of:

preventing a write of the first set of data to the array in response to the ECC comparison signal being in the first state.

29. The method of claim 25 further comprising the step of:

comparing, in response to the ECC comparison signal being in the first state, the first set of data stored in the buffer with a second set of data stored in the array to generate a set comparison signal having a first state indicative of a match between the first and second sets of data and a second state indicative of a miscomparison between the first and second sets of data.

30. The method of claim 29 further comprising the step of:

preventing a write of the first set of data to the array in response to the set comparison signal being in the first state.

31. The method of claim 29 further comprising the step of:

causing the nonvolatile memory system to write the first set of data from the buffer to the array in response to the set comparison signal being in the second state.

32. A method of operating a nonvolatile memory system having an array of nonvolatile memory cells organized into sets, each set having sufficient memory cells to store a set of data, the method comprising the steps of:

receiving a first set of data to be written to the array;

storing the first set of data in a buffer;

calculating first ECC check bits representative of the first set of data before or during the first set of data being stored in the buffer;

storing the first set of data and the first ECC check bits into the array;

reading the first set of data and the first ECC check bits from the array; and detecting errors in the first set of data read from the array based on the first set of data read from the array and the first ECC check bits read from the array.

33. The method of claim 32 wherein at least one of the errors detected in the comparing step is created by the buffer.

34. The method of claim 32 further comprising the step of:

correcting certain errors in the first set of data read from the array.

35. The method of claim 34 wherein at least one of the certain errors is created by the buffer.

36. A computer system comprising:

a host processor; and a nonvolatile memory subsystem including:

a host processor interface receiving data from the host processor, an array of nonvolatile memory cells organized into sets, each set having sufficient memory cells to store a set of data, a buffer receiving and storing a first set of data from the host processor interface to be written to the array, and error correction code (ECC) circuitry receiving the first set of data from the host processor interface and calculating ECC check bits representative of the first set of data before or during the first set of data being written to the buffer.

37. A computer system comprising:

a host processor; and a nonvolatile memory subsystem including:

a host processor interface receiving data from the host processor, an array of nonvolatile memory cells organized into sets, each set having sufficient memory cells to store a set of data, a buffer for receiving and storing a first set of data from the host processor interface to be written to the array, error correction code (ECC) circuitry receiving the first set of data from the host processor interface and calculating first ECC check bits representative of the first set of data, and ECC comparison circuitry for comparing the first ECC check bits with second ECC check bits representative of a second set of data stored in the array to generate an ECC comparison signal having a first state indicative of a match between the first and second ECC check bits and a second state indicative of a miscomparison between the first and second ECC check bits.

38. The computer system of claim 37 wherein the first set of data is to be written from the host processor to the array to replace the second set of data.

39. The computer system of claim 37 wherein the host processor interface further receives memory commands and data from the host processor and responds to the memory commands to generate control signals, and wherein the computer system further comprises:

a control engine responsive to at least one of the control signals and the ECC comparison signal being in the second state to cause the nonvolatile memory system to write the first set of data from the buffer to the array.

40. The computer system of claim 37 wherein the host processor interface further receives memory commands and data from the host processor and responds to the memory commands to generate control signals, and wherein the computer system further comprises:

a control engine responsive to at least one of the control signals and the ECC comparison signal being in the first state to prevent a write of the first set of data to the array, wherein the at least on control signal is at least indicative of a memory command from the host processor for controlling a write of the first set of data to the array.

41. The computer system of claim 40 wherein the control engine asserts a confirmation signal to the host processor interface in response to the at least one of the control signals and the ECC comparison signal being in the first state, the comparison signal indicating that the first state of data has been written into the array.

42. The computer system of claim 37 wherein the host processor interface further receives memory commands and data from the host processor and responds to the memory commands to generate control signals, and wherein the computer system further comprises:

comparator for comparing the first set of data stored in the buffer with a second set of data stored in the array to generate a set comparison signal having a first state indicative of a match between the first and second sets of data and a second state indicative of a miscomparison between the first and second sets of data;

a control engine responsive to at least one of the control signals and the ECC comparison signal being in the first state to cause the comparator to compare the first set of data to the second set of data.

43. The nonvolatile memory system of claim 42 wherein the control engine is responsive to the at least one of the control signals and the set comparison signal being in the first state to prevent a write of the first set of data to the array, and wherein the at least on control signal is at least indicative of a memory command from the host processor for controlling a write of the first set of data to the array.

44. The computer system of claim 43 wherein the control engine asserts a confirmation signal to the host processor interface in response to the at least one of the control signals and the ECC comparison signal being in the first state, the comparison signal indicating that the first state of data has been written into the array.

45. The nonvolatile memory system of claim 42 wherein the control engine is responsive to the at least one of the control signals and the set comparison signal being in the second state to cause the nonvolatile memory system to write the first set of data from the buffer to the array.

46. A computer system comprising:

a host processor; and a nonvolatile memory subsystem including:

a host processor interface receiving data from the host processor, an array of nonvolatile memory cells organized into sets, each set having sufficient memory cells to store a set of data, a buffer receiving and storing a first set of data from the host processor interface to be written to the array, and error correction code (ECC) circuitry receiving the first set of data and calculating first ECC check bits representative of the first set of data before or during the first set of data being written to the buffer and detecting errors in the first set of data read from the array based on the first set of data after the first set has been written to and subsequently read from the array and the first ECC check bits after the first ECC check bits have been written to and subsequently read from the array; and array interface circuitry providing the first set of data stored in the buffer and the first ECC check bits to the array for writing into the array and subsequently reading the first set of data from the array and the first ECC check bits representative of the first set of data read from the array.

47. The computer system of claim 46 wherein at least one of the detected errors is created by the buffer.

48. The computer system of claim 46 wherein the ECC circuitry further corrects certain errors in the first set of data read from the array.

49. The computer system of claim 48 wherein at least one of the certain errors is created by the buffer.

* * * * *